United States Patent [19]

Servi

[11] Patent Number: 5,319,711
[45] Date of Patent: Jun. 7, 1994

[54] WIRELESS DEVICE FOR VERIFYING IDENTIFICATION

[75] Inventor: Leslie D. Servi, Lincoln, Mass.

[73] Assignee: GTE Laboratories Incorporated, Waltham, Mass.

[21] Appl. No.: 932,133

[22] Filed: Aug. 19, 1992

[51] Int. Cl.⁵ .................. H04L 9/32; H04L 9/00; H04K 1/02
[52] U.S. Cl. .......................... 380/23; 380/6; 380/49; 340/825.31; 340/825.34
[58] Field of Search ............... 380/6, 8, 23, 49, 50; 340/825.31, 825.34; 235/380, 382

[56] References Cited

U.S. PATENT DOCUMENTS

| | | | |
|---|---|---|---|
| 3,609,690 | 9/1971 | Nissman et al. | 340/825.34 |
| 4,591,704 | 5/1986 | Sherwood et al. | 235/380 |
| 4,779,224 | 10/1988 | Moseley et al. | 395/200 |
| 4,853,962 | 8/1989 | Brockman | 380/44 |
| 4,903,299 | 2/1990 | Lee et al. | 380/6 X |
| 5,130,519 | 7/1992 | Bush et al. | 235/380 |
| 5,131,038 | 7/1992 | Puhl et al. | 380/23 |
| 5,150,412 | 9/1992 | Maru | 380/43 |

Primary Examiner—Bernarr E. Gregory
Attorney, Agent, or Firm—Lawrence E. Monks

[57] ABSTRACT

A wireless communication device using a verification protocol for verifying the identification of the wireless device by a wireless network control station in the presence of eavesdroppers is disclosed. Upon receiving a call request from a wireless device claiming a particular identity, the wireless network control station sends a mask consisting of binary digits in a random order. The wireless device is expected to respond to this mask with a reply that is consistent with both the password contained in the device and the mask. Specifically, the bits of both the password and the mask are "ANDed" and the result transmitted to the wireless network control station as the reply.

6 Claims, 2 Drawing Sheets 5,319,711

WIRELESS DEVICE FOR VERIFYING IDENTIFICATION

FIELD OF THE INVENTION

The current invention relates generally to an apparatus for secure information exchange between two devices and more particularly to a method and apparatus for exchanging and verifying a password between a wireless device and a wireless network control station.

BACKGROUND OF THE INVENTION

Wireless mobile communication devices such as wireless phones have become increasingly popular and common. Wireless personal communication systems (PCS) are emerging. These devices give the user the flexibility to initiate telephone calls from other than fixed locations. However, as a result of this mobility and flexibility it is more difficult for the service provider, the telephone company, to positively identify the caller so as to properly bill for the call. Unlike a conventional phone, wireless devices are not permanently located, and thus are not easily identified by a drop at the end of a telephone line. Rather, wireless devices must make known their identity at call start-up for the call to proceed.

In performing this identification process it is clear that an identification code and/or password must be provided by the caller to a wireless network control station which verifies the identity of the caller and connects the caller to the public telephone network. The identification code must be transmitted by the wireless device by radio means and is thus inherently insecure. A third party, knowing the frequency of the wireless transmission can intercept the transmission and learn the identification code of the caller. This permits the eavesdropper to determine the identity of the caller and the identification code of the device, allowing him to later commit telephone fraud by electronically impersonating the identity of that caller.

In one approach to securing the process of identification of the wireless device, a public key cryptosystem has been utilized. Using a public key encryption method, verification procedures can be designed such that wireless network control stations are not required to access databases to look up passwords, and an unlimited number of eavesdropped authentications will not be sufficient to impersonate a wireless device. However, such methods require substantial computation in order to operate.

It is thus desirable to provide a means and apparatus for transmitting an identification code by a wireless device caller to a wireless network control station, providing verification threat which is not susceptible to discovery by a third party and is not computationally substantial.

OBJECTS OF THE INVENTION

It is a primary object of the instant invention to obviate the above noted disadvantages of the prior art.

It is an object of the current invention to provide for reliable identification of a wireless device while attempting to initiate a call through the telephone network.

It is a further object of the invention to provide for reliable identification using reduced data transmission.

It is a yet further object of the invention to provide for reliable identification of a wireless device using reduced data storage in the device.

It is a yet further object of the invention to provide for reliable identification of a wireless device without a substantial computation requirement.

SUMMARY OF THE INVENTION

The above and other objects and advantages are achieved in one aspect of this invention by a wireless communication device having an unique identification for communicating with a wireless network control station. The wireless control station verifies the identity of the wireless device and completes the call request of the device upon successful verification. In addition to the device's identification, a password which is known to the wireless network control station is stored in the device to be utilized during the verification process. Upon receiving a call request from a wireless device claiming a particular identity, the wireless network control station sends a mask consisting of binary digits in a random order. The wireless device is expected to respond to this mask with a reply that is consistent with both the password of the device and the mask. Specifically, the bits of both the password and the mask are "ANDed" and the result transmitted to the wireless network control station as the reply. The wireless network control station denies the call request upon failure to respond properly.

In another aspect of the invention, the wireless network control station sends the mask to the device as addresses. Each address specifies the position of a binary "one" in the mask.

In yet another aspect of the invention, exemplary values for the length of the password and the mask are disclosed so as to minimize either transmission time or the storage requirements in the wireless device. Other values can be determined to satisfy other network strategies and objectives.

BRIEF DESCRIPTION OF THE DRAWINGS

For a better understanding of the present invention, together with other objects, advantages and capabilities thereof, reference is made to the following Description and appended Claims, together with the Drawings, in which:

DETAILED DESCRIPTION OF THE INVENTION

Figure 1:
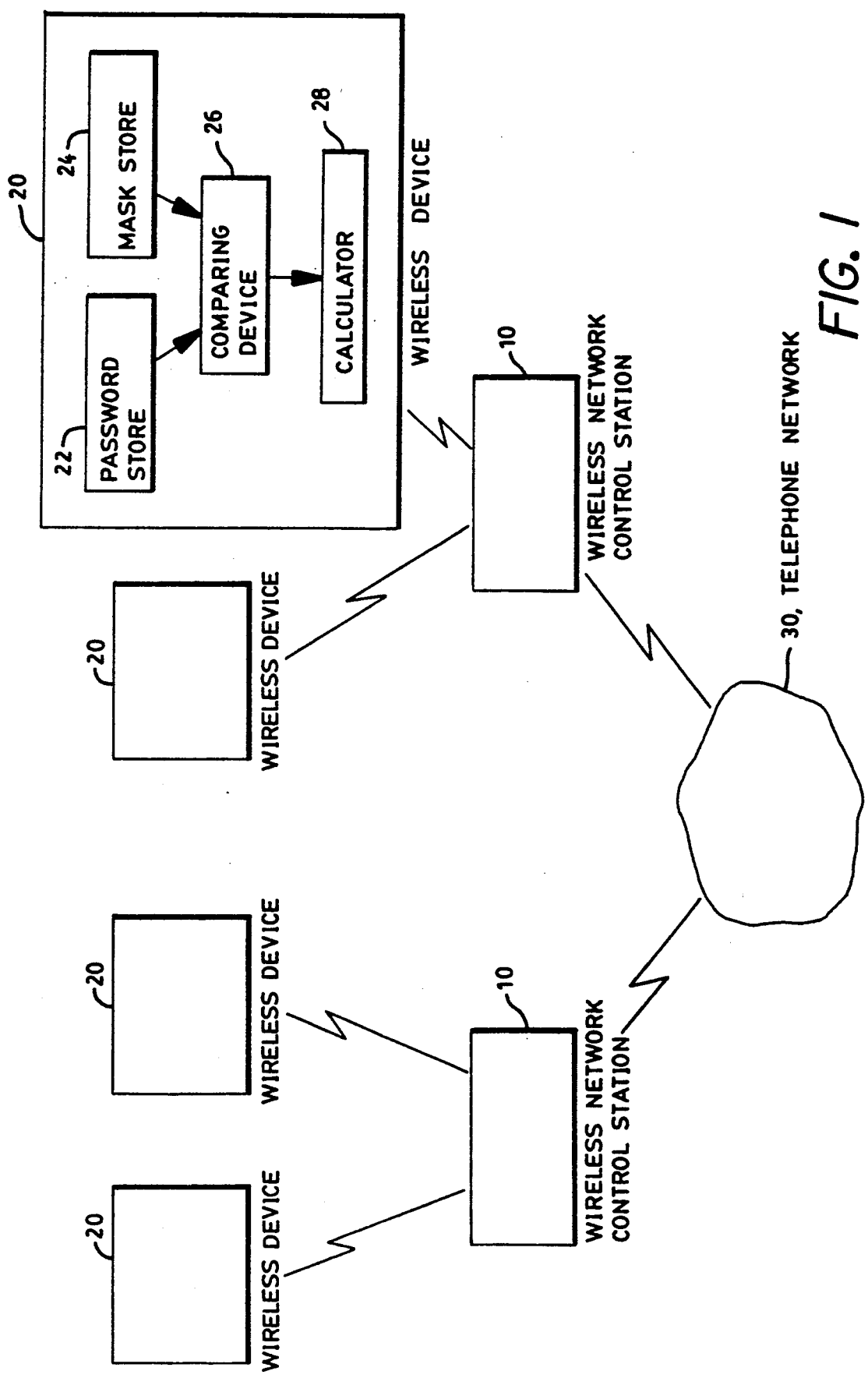
FIG. 1 is an illustration of the components of a wireless network in accordance with the instant invention.

In FIG. 1, the components of a wireless network are illustrated. The network consists of one or more wireless network control stations 10 that allow a plurality of wireless devices 20 to connect to the public switched telephone network 30. In performing this connection to the telephone network 30, the wireless network control station 10 must determine and validate the identity of the wireless caller in order to at least provide proper billing for the call. Accordingly, upon call initiation the calling wireless device 20 must transmit an identification signal to be verified at the wireless network control station 10 before allowing the connection to the public network 30.

In one embodiment of the invention, each wireless device is assigned a randomly selected password consisting of N bits that is delivered to the device and stored therein (22). If the password is sent electronically, the transmission must maintain a high level of protection from interception and deciphering. One of ordinary skill in the art will recognize that other methods of delivering and storing the password include transferring a PROM or providing for a fixed ROM within the the wireless device. Since the password assignment is done only once, slower-secure methods of sending the password are feasible.

At call set-up the wireless device requesting access to the telephone network transmits an intention to make a call and an identification code. Upon receiving the request, the wireless network control station responsible for connecting the call to the telephone network verifies the identity of the caller. Wireless network control station randomly selects a binary number consisting of N bits and having exactly M ones and N-M zeros. The values of the parameters N and M are chosen to meet network design objectives that will be described later. The selected N-bit number called a mask is transmitted to the calling wireless device wherein it is stored (24) for further processing. Electronics within the wireless device compares (26) and calculates (28) a response to the mask whereby if the ith bit of the transmitted N-bit number or mask is 0 then the corresponding ith bit of the response is zero and if the ith bit of the mask is 1 then the ith bit of the response is set to the ith bit of the password. The response is transmitted from the wireless device to the wireless network control station.

The wireless network control station verifies the authenticity of the response by determining whether the claimed identity is consistent with the response, mask, and the password stored in the wireless device of the claimed identity and known only by the wireless network control station. It is clear that all communication is conducted in a error-free transmission medium using perhaps conventional error-correcting codes so as not to misrepresent either the mask or the response.

In one embodiment of the invention, the mask is transmitted by the wireless network control station as M binary numbers, p(i), i=1, ..., M, where p(i) is the ith position containing a one. In this embodiment M $\text{Log}_2 N$ bits are required to be transmitted as the mask, which under certain values of N and M is less than the N bits of the embodiment described above. In another embodiment of the invention a further reduction of the number of bits required to be sent is possible if the mask is selected such that $0 \leq p(i+1)-p(i) < (N/M)$. Accordingly, it is sufficient to transmit the M binary numbers $p(i+1)-p(i)$ for i=2, ..., M and p(1). Thus, the position of the first one bit or p(1) is sent and the difference from the preceding one bit to the next one bit in the mask is sent as p(i). This embodiment utilizes $M\text{Log}_2(M/N)$ bits.

In a yet further embodiment of the invention the wireless device transmits a reply indicating the address of the position of each bit of the password having a binary value of one in response to the mask. One eavesdropping on the transmissions of the wireless network control station knows only the values of the password in the p(i) positions for i=1,2 ..., M. The information is therefore of minimal value in attempting to impersonate the identity of the wireless device.

As was stated previously, the values of N and M may be chosen to satisfy security objectives for the wireless network. In determining appropriate values for the variables N and M for a particular network design so as to determine probabilistically the likelihood, p, that an impersonator will be successful in correctly responding to a mask after K eavesdroppings, the following analysis is considered.

If $L_K$ is the average number of positions of the password that are known by one after eavesdropping on K exchanges between the wireless device and the wireless network control station.

$$L_K = M + (1-(M/N))L_{K-1} \text{ and } L_1 = M. \tag{1}$$

This relationship expresses that after each additional eavesdropped interaction, the interceptor knows about the password what he knew before, $L_{K-1}$, plus the M digits that were just learned minus the expected number of bits he just heard but already knew,$(M/N)L_{K-1}$. $L_K$ is thus uniquely:

$$L_K = N(1-[1-(M/N)]^K). \tag{2}$$

If having eavesdropped K times, one attempts to impersonate the wireless device, a mask is sent by the wireless network control station that consists of M randomly selected positions containing the value binary one. Of these positions, on average, $(M/N)L_K$ positions of the password of the legitimate wireless device are known to him and $M-(M/N)L_K$ positions are not known to him. The average number of unknown positions is calculated as:

$$\begin{aligned} F(N,M,K) &= M - (M/N)L_K \\ &= M - (M/N)\{N(1-[1-(M/N)]^K)\} \\ &= M - (1(M/N))^K. \end{aligned} \tag{3}$$

Through proper choice of these parameters different network design objectives and strategies can be satisfied.

If the network design objective is to maximize the number of unknown bits of the password to an impersonator, the value of M that will maximize F(N,M,K) is $$M = N/(K+1). \tag{4}$$

It is understood that M must be an integer and thus the value determined is rounded if necessary. Combining these expressions, $F(N,(N/(K+1),K) = (N/K+1)^K$ which for $K \geq 20$ is very accurately approximated by $0.37N/(K+1)$. The chance of an eavesdropper correctly determining the F(N,M,K) unknown bits is approximately $0.5^{**}F(N,M,K)$ or stated in words 0.5 raised to the F(N,M,K) exponent. If the chance of an eavesdropper correctly determining the unknown bits is desired to be p, then F(N,(N/(K+1),K) is determined to be $-\log_2(p)$. Accordingly, N is calculated to be approximately $-\log_2(p)(K+1)/0.37$ and consequently M is approximately $-\log_2(p)/0.37$ which is independent of K as long as $K \geq 20$.

If an alternative network design objective is to reduce N, thus limiting the amount of memory required by the wireless device, m should be chosen as approximately $-\text{Log}_2(p)/0.4$ and N is consequently chosen as $-2.5K\text{Log}_2(p)$ for a given percentage p of success in responding with the correct reply after K eavesdropping attempts.

If yet another network design objective is to reduce the time for transmission of the verification procedure, this amounts to reducing the value $MLog_2(N)$. The value for M should be chosen as approximately $Int[1-Log_2(p)]$ and n is calculated as $M/(1+(Log_2(p)/M)^{**}(1/K))$ for a given percentage p of success in responding with the correct reply after K eavesdropping attempts.

Figure 2:
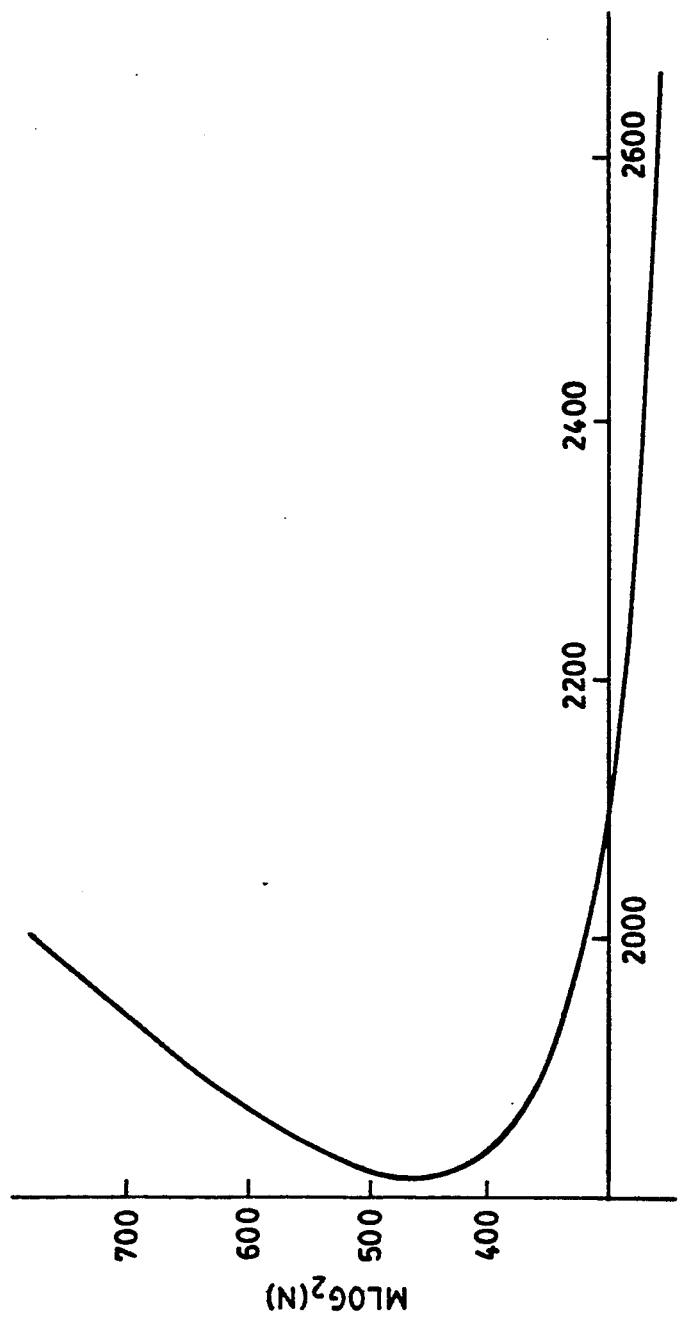
FIG. 2 is a graph of the trade-off between memory requirements for the wireless device and transmission requirements for a successful impersonation of a legitimate wireless device with probability no greater than 0.0001 after up to 50 eavesdroppings.

FIG. 2 is a graph of the trade-off between memory requirements imposed upon the wireless device and the transmission requirements for performing the verification procedure for values of K up to 50 and p no greater than 0.0001.

EXAMPLES

The following Examples and Table are presented to enable those skilled in the art to more clearly understand and practice the present invention. These Examples should not be considered as a limitation upon the scope of the present invention, but merely as being illustrative and representative thereof.

TABLE 1 provides an exact calculation in accordance with the invention of the range of parameters M and N, and the associated transmission requirements such that the probability that an eavesdropper successfully impersonates a legitimate wireless device after 50 eavesdropping would be no greater than 0.0001.

TABLE 1

Computation of memory requirements, n, and transmission requirements, $m(n)Log_2(n)$ as a function of m for k = 50 and p = $10^{-4}$.

| m | n | m $Log_2(n)$ |
|---|---|---|
| 14 | 13654 | 196 |
| 15 | 6243 | 195 |
| 16 | 4336 | 208 |
| 17 | 3472 | 204 |
| 18 | 2983 | 216 |
| 19 | 2673 | 228 |
| 20 | 2461 | 240 |
| 21 | 2309 | 252 |
| 22 | 2197 | 264 |
| 23 | 2111 | 276 |
| 24 | 2045 | 264 |
| 25 | 1993 | 275 |
| 26 | 1952 | 286 |
| 27 | 1920 | 297 |
| 28 | 1895 | 308 |
| 29 | 1875 | 319 |
| 30 | 1859 | 330 |
| 31 | 1847 | 341 |
| 32 | 1838 | 352 |
| 33 | 1832 | 363 |
| 34 | 1828 | 374 |
| 35 | 1826 | 385 |

TABLE 1-continued

Computation of memory requirements, n, and transmission requirements, $m(n)Log_2(n)$ as a function of m for k = 50 and p = $10^{-4}$.

| m | n | m $Log_2(n)$ |
|---|---|---|
| 36 | 1826 | 396 |
| 37 | 1827 | 407 |
| 38 | 1829 | 418 |
| 39 | 1832 | 429 |
| 40 | 1836 | 440 |
| 41 | 1841 | 451 |
| 42 | 1847 | 462 |
| 43 | 1854 | 473 |
| 44 | 1861 | 484 |
| 45 | 1869 | 495 |
| 46 | 1877 | 506 |
| 47 | 1885 | 517 |
| 48 | 1894 | 528 |
| 49 | 1903 | 539 |
| 50 | 1913 | 550 |

While there has been shown and described what are at present considered the preferred embodiments of the invention, it will be obvious to those skilled in the art that various changes and modifications can be made therein without departing from the scope of the invention as defined by the appended claims.

What is claimed is:

1. A wireless device for responding to an external identification request comprising:
   a first memory means for storing a password having a plurality of bits;
   a second memory means for storing a mask having a plurality of bits;
   a comparison means for comparing the bits of said mask with the bits of said password;
   a processing means for producing a response to said external identification request, said response having a plurality of bits such that each bit of the response is binary one, when the corresponding bit of said mask and of said password is binary one.

2. The wireless device of claim 1 wherein a bit of the response of the processing means is binary zero when the corresponding bit of the mask is binary zero.

3. The wireless device of claim 1 wherein a bit of the response of the processing means is binary zero when the corresponding bit of the password is binary zero.

4. The wireless device of claim 1 wherein said mask of the second memory means includes addresses specifying the position of a binary one.

5. The wireless device of claim 1 wherein said mask of the second memory means includes the position of the first binary one in the mask and a differential increment of the next value of binary one in the mask.

6. The wireless device of claim 1 wherein said processing means produces a response of a plurality of addresses such that each address indicates a binary one when a bit of the mask and the corresponding bit of the password are binary one.

* * * * *